(12) United States Patent
Kondo et al.

(10) Patent No.: US 7,366,636 B2
(45) Date of Patent: Apr. 29, 2008

(54) ROTATIONAL ANGLE DETECTOR

(75) Inventors: Seiji Kondo, Aichi (JP); Takeshi Nakata, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 0 days.

(21) Appl. No.: 11/556,908

(22) Filed: Nov. 6, 2006

(65) Prior Publication Data

US 2007/0103147 A1    May 10, 2007

(30) Foreign Application Priority Data

Nov. 7, 2005   (JP) .............................. 2005-322745

(51) Int. Cl.
*G01P 3/00* (2006.01)
*G06F 15/00* (2006.01)

(52) U.S. Cl. ....................... 702/151; 702/145; 702/147

(58) Field of Classification Search ................ 702/145, 702/147, 151, 182; 73/862.326, 862.331
See application file for complete search history.

(56) References Cited

U.S. PATENT DOCUMENTS

| | | | |
|---|---|---|---|
| 5,930,905 A | 8/1999 | Zabler et al. | |
| 6,552,534 B2 * | 4/2003 | Desbiolles et al. | .... 324/207.25 |
| 7,073,398 B2 * | 7/2006 | Kondo et al. | .......... 73/862.326 |
| 7,200,515 B2 | 4/2007 | Sakabe et al. | |
| 7,277,816 B2 * | 10/2007 | Kanekawa et al. | ......... 702/145 |

FOREIGN PATENT DOCUMENTS

| JP | 59-226806 A | 12/1984 |
|---|---|---|
| JP | 2004-239670 A | 8/2004 |
| JP | 2005-003625 A | 1/2005 |
| JP | 2005-249769 A | 9/2005 |

* cited by examiner

*Primary Examiner*—Bryan Bui
(74) *Attorney, Agent, or Firm*—Crompton, Seager & Tufte, LLC

(57) ABSTRACT

A rotational angle detector for detecting the rotational angle of the rotor in a wide range without requiring dark current. A first detection gear including an m number of teeth and a second detection gear including an L number of teeth are each engaged with a main gear rotated integrally with a steering shaft which includes an n number of teeth. A microcomputer calculates a rotational angle $\theta$ of the steering shaft using a rotational angle $\alpha$ of the first detection gear within one cycle and a rotational angle $\beta$ of the second detection gear within one cycle.

3 Claims, 3 Drawing Sheets

ROTATIONAL ANGLE DETECTOR

CROSS-REFERENCE TO RELATED APPLICATIONS

This application is based upon and claims the benefit of priority from the prior Japanese Patent Application No. 2005-322745, filed on Nov. 7, 2005, the entire contents of which are incorporated herein by reference.

BACKGROUND OF THE INVENTION

The present invention relates to a rotational angle detector for detecting the rotational angle of a rotor.

Japanese Laid-Open Patent Publication No. 2004-239670 discloses a steering angle sensor for detecting the rotational angle of a steering wheel for an automobile. The steering angle sensor includes a main gear that integrally rotates with the steering wheel, a detection gear engaged with the main gear and incorporating a magnet, and a magneto-resistance element for magnetically detecting the rotational angle of the detection gear.

The magneto-resistance element provides a microcomputer with a first analog signal, which has a sinusoidal shape that changes cyclically whenever the main gear (steering wheel) is rotated by 60 degrees (whenever the detection gear is rotated by 360 degrees), and a second analog signal, which has a sinusoidal shape with a phase shifted by one fourth of a cycle from the first analog signal. This enables the microcomputer to obtain the rotational angle of the steering wheel within the range of 0 to 60 degrees of the rotational angle of the steering wheel based on the combination of the first analog signal and the second analog signal provided from the magneto-resistance element. Thus, even after the steering wheel is rotated to a new rotational angle within the range of 0 to 60 degrees while the ignition switch is turned OFF, the microcomputer can immediately obtain the new rotational angle when the ignition switch is turned ON.

SUMMARY OF THE INVENTION

However, when the ignition is turned ON after the steering wheel is changed to a new rotational angle exceeding the range of 0 to 60 degrees while the ignition is turned OFF, the microcomputer cannot immediately obtain the new rotational angle. In order for the microcomputer to immediately obtain the rotational angle in such a case, power must be supplied to the magneto-resistance element and the microcomputer must be kept effective even when the ignition switch is turned OFF. Therefore, a so-called dark current becomes necessary when the ignition switch is turned OFF.

The present invention provides a rotational angle detector for detecting the rotational angle of a rotor over a wide range without having to use dark current.

One aspect of the present invention is a device for detecting rotational angle of a rotor. The device has a main gear, a first detection gear, a second detection gear, a first detection means, a second detection means and a rotational angle calculating means. The main gear is rotated integrally with the rotor and includes an n number of teeth. The first detection gear includes an m number of teeth engageable with the main gear and is rotated together with the main gear. The second detection gear includes an L number of teeth engageable with the main gear and is rotated together with the main gear. L is greater than m. The first detection means detects rotational angle $\alpha$ of the first detection gear within a cycle set in accordance with a predetermined angle. The second detection means detects rotational angle $\beta$ of the second detection gear within the cycle. The rotational angle calculating means calculates a rotational angle $\theta$ of the rotor using the rotational angle $\alpha$ of the first detection gear within the cycle detected by the first detection means and the rotational angle $\beta$ of the second detection gear within the cycle detected by the second detection means. The rotational angle calculating means calculates a first rotational angle $\theta 1$ based on $\theta 1 = mL/\{n(L-m)\} \times [(\alpha-\beta)+(i-j)\Omega]$, where $\Omega$ is an angle corresponding to the cycles of $\alpha$ and $\beta$, i is an integer indicating the number of cycles completed by the first detection gear in relation with the rotational angle $\alpha$, j is an integer indicating the number of cycles completed by the second detection gear in relation with the rotational angle $\beta$, i=j is satisfied in the case of $\alpha \geq \beta$, and i=j+1 is satisfied in the case of $\alpha < \beta$. The rotational angle calculating means calculates a second rotational angle $\theta 2$ based on $\theta 2 = m/n \times \alpha$. The rotational angle calculating means calculates the integer i indicating the number of cycles completed by the first detection gear in relation with the rotational angle $\alpha$ based on $i = (\theta 1 - \theta 2) n / (m\Omega)$ using the calculated first rotational angle $\theta 1$ and the second rotational angle $\theta 2$. The rotational angle calculating means calculates the rotational angle $\theta$ of the rotor based on $\theta = m/n \times (\alpha + i\Omega)$ using the calculated integer i.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
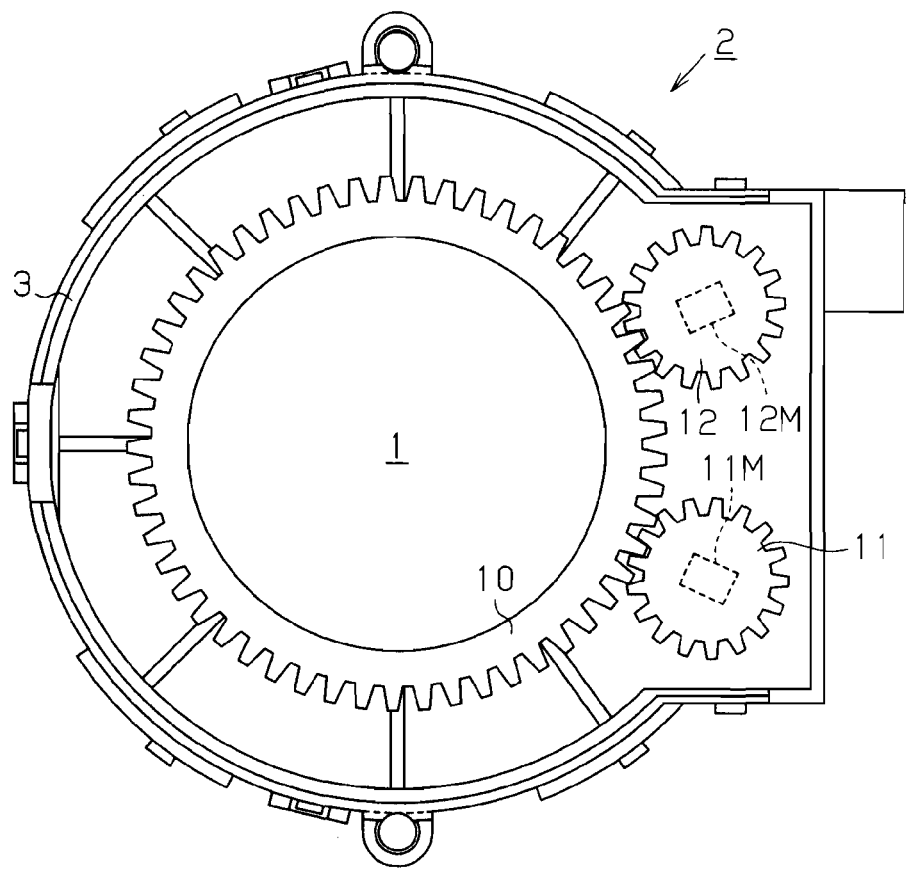
FIG. 1 is a plan view schematically showing a state in which a steering angle sensor according to a preferred embodiment of the present invention is attached to a steering shaft.

In the drawings, like numerals are used for like elements throughout.

A steering angle sensor for an automobile according to a preferred embodiment of the present invention will now be discussed.

As shown in FIG. 1, a steering wheel (not shown) is mounted on the distal end of a steering shaft 1, and a steering angle sensor 2 is attached to the steering shaft 1 to detect the rotational angle of the steering shaft 1 and obtain the rotation angle of the steering wheel.

The steering angle sensor 2 includes a cylindrical housing 3. A main gear 10 having an n number (102 in the present embodiment) of teeth formed along its circumference is arranged in the housing 3. The main gear 10 is integrally rotatable with the steering shaft 1. The main gear 10 is engaged with a first detection gear 11, which has an m number (51 in the present embodiment) of teeth formed along its circumference and incorporates a magnet 11M, and a second detection gear 12, which has an L number (54 in the present embodiment) of teeth formed on its circumference and incorporating a magnet 12M.

Figure 2:
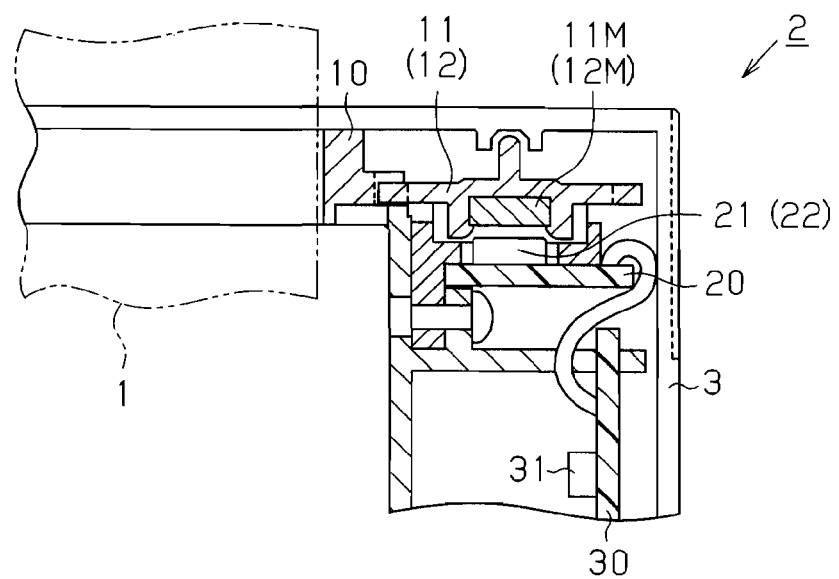
FIG. 2 is a cross-sectional view schematically showing the state in which the steering angle sensor is attached to the steering shaft.

As shown in FIG. 2, a printed circuit board 20 is arranged below the first detection gear 11 and the second detection gear 12. A first magneto-resistance element 21 for magnetically detecting the rotational angle α of the first detection gear 11 is arranged on the printed circuit board 20 directly below the magnet 11M. Furthermore, a second magneto-resistance element 22 for magnetically detecting the rotational angle β of the second detection gear 12 is arranged on the printed circuit board 20 directly below the magnet 12M. A further printed circuit board 30 is arranged below the printed circuit board 20 in a direction orthogonal to the plane of the printed circuit board 20. A microcomputer 31 for calculating the rotational angle θ of the steering shaft 1 with the rotational angle α of the first detection gear 11 and the rotational angle β of the second detection gear 12 is connected to the printed circuit board 30.

Figure 3:
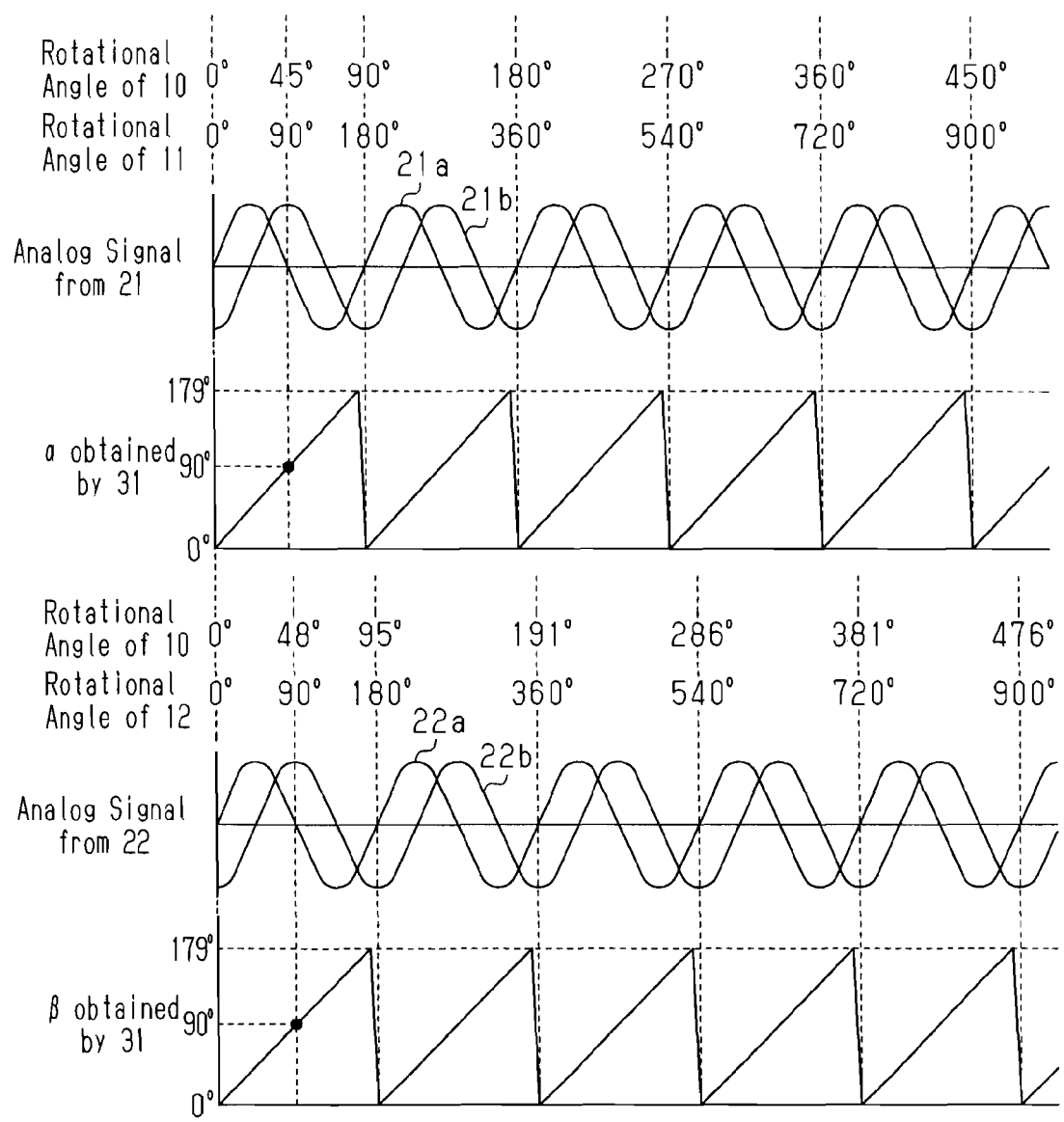
FIG. 3 is a time chart illustrating operations performed when the steering wheel is rotated.

As shown in FIG. 3, the first magneto-resistance element 21 provides the microcomputer 31 with a first analog signal 21a, which has a sinusoidal shape that changes cyclically in accordance with the rotation of the first detection gear 11, and a second analog signal 21b, which has a sinusoidal shape with a phase shifted by one fourth of a cycle from the first analog signal 21a. One cycle of the first analog signal 21a corresponds to m/n×Ω degrees of rotation for Ω degrees (180 degrees in the present embodiment) of the first detection gear 11 (main gear 10, or steering wheel). In the present embodiment, one cycle corresponds to the rotation obtained from 51/102×180=90 degrees.

The microcomputer 31 obtains the rotational angle α of the first detection gear 11 within one cycle based on the combination of the first analog signal 21a and the second analog signal 21b provided from the first magneto-resistance element 21.

The following relational equation is satisfied when the number of teeth of the main gear 10 is represented by n, the rotational angle of the steering shaft 1 is represented by θ, the number of teeth of the first detection gear 11 is represented by m, and the rotational angle of the first detection gear 11 is represented by α'.

$$n\theta = m\alpha' \quad (1)$$

θ derived from equation 1 is expressed as shown below.

$$\theta = m/n \times \alpha' \quad (2)$$

α' derived from equation 2 is expressed as shown below.

$$\alpha' = n/m \times \theta \quad (3)$$

The rotational angle α' of the first detection gear 11 is expressed as shown below when the rotational angle of the first detection gear 11 within one cycle obtained by the microcomputer 31 is set as α, the integer indicating the number of cycles completed by the first detection gear 11 with respect to α is set as i, and the angle for one cycle of α is set as Ω.

$$\alpha' = \alpha + i\Omega \quad (4)$$

α derived from equation 4 is expressed as shown below.

$$\alpha = \alpha' - i\Omega \quad (5)$$

The second magneto-resistance element 22 provides the microcomputer 31 with a third analog signal 22a, which has a sinusoidal shape. One cycle of the third analog signal 22a corresponds to L/n×Ω degrees of rotation for Ω degrees (180 degrees in the present embodiment) of the second detection gear 12 (main gear 10, or steering wheel). In the present embodiment, one cycle corresponds to the rotation obtained from 54/102×180=about 95 degrees. The second magneto-resistance element 22 also provides the microcomputer 31 with a fourth analog signal 22b having a sinusoidal shape with a phase shifted by one fourth of a cycle from the third analog signal 22a.

The microcomputer 31 obtains the rotational angle β of the second detection gear 12 within one cycle based on the combination of the third analog signal 22a and the fourth analog signal 22b provided from the second magneto-resistance element 22.

The following relational equation is satisfied when the number of teeth of the main gear 10 is represented by n, the rotational angle of the steering shaft 1 is represented by θ, the number of teeth of the second detection gear 12 is represented by L, and the rotational angle of the second detection gear 12 is represented by β'.

$$n\theta = L\beta' \quad (6)$$

θ derived from equation 6 is expressed as shown below $$\theta = L/n \times \beta' \quad (7)$$

β' derived from equation 7 is expressed as shown below.

$$\beta' = n/L \times \theta \quad (8)$$

The rotational angle β' of the second detection gear 12 is expressed as shown below when the rotational angle of the second detection gear 12 within one cycle obtained by the microcomputer 31 is set as β, the integer indicating the number of the cycles completed by the second detection gear 12 with respect to β is set as j, and the angle for one cycle of β is set as Ω.

$$\beta' = \beta + j\Omega \quad (9)$$

β derived from equation 9 is expressed as shown below.

$$\beta = \beta' - j\Omega \quad (10)$$

"α−β" derived from equations 3, 5, 8, and 10 is expressed as shown below.

$$\alpha - \beta = n/m \times \theta - n/L \times \theta - (i-j) \times \Omega \quad (11)$$

θ derived from equation 11 is expressed as shown below.

$$\theta = mL/\{n(L-m)\} \times [(\alpha-\beta) + (i-j)\Omega] \quad (12)$$

It should be noted that i=j is satisfied in the case of α≧β, and i=j+1 is satisfied in the case of α<β.

In this manner, θ is calculated. In the present embodiment, the microcomputer 31 calculates the first rotational angle θ1(θ) using equation 12.

The second rotational angle θ2 is calculated using α from the following equation.

$$\theta 2 = m/n \times \alpha \quad (13)$$

In the present embodiment, the microcomputer 31 calculates the second rotational angle θ2 using equation 13.

"θ1−θ2" derived from equations 12 and 13 is expressed as shown below.

$$\theta 1 - \theta 2 = m/\{n(L-m)\} \times (m\alpha - L\beta) + mL/\{n(L-m)\} \times (i-j)\Omega \quad (14)$$

"mα−Lβ" derived from equations 2, 4, 7, and 9 is expressed as shown below.

$$m\alpha - L\beta = -\Omega(mi - Lj) \quad (15)$$

When substituting equation 15 to equation 14 to obtain i, i is expressed as shown below.

$$i = (\theta 1 - \theta 2) n / (m\Omega) \quad (16)$$

In this manner, i is calculated. In the present embodiment, the microcomputer 31 calculates the integer i indicating the number of cycles completed by the first detection gear 11 with respect to the rotational angle α using equation 16.

θ derived from equations 2 and 4 is expressed as shown below.

$$\theta = m/n \times (\alpha + i\Omega) \quad (17)$$

In this manner, θ is calculated. In the present embodiment, the microcomputer 31 calculates the rotational angle θ of the steering shaft 1 using equation 17.

The operation of the steering angle sensor 2 will now be discussed.

When the steering shaft 1 is rotated by rotation of the steering wheel, the steering shaft 1 and the main gear 10 are rotated integrally with each other. Further, the first detection gear 11 and the second detection gear 12, which are engaged with the main gear 10, are rotated together with the main gear 10.

The first analog signal 21a and the second analog signal 21b are then provided from the first magneto-resistance element 21 to the microcomputer 31, and the third analog signal 22a and the fourth analog signal 22b are provided from the second magneto-resistance element 22 to the microcomputer 31, as shown in FIG. 3. The microcomputer 31 then obtains the rotational angle α of the first detection gear 11 within one cycle based on the combination of the first analog signal 21a and the second analog signal 21b. Furthermore, the microcomputer 31 obtains the rotational angle β of the second detection gear 12 within one cycle based on the combination of the third analog signal 22a and the fourth analog signal 22b.

The microcomputer 31 calculates θ1 using equation 12 and calculates θ2 using equation 13 after obtaining α and β.

The microcomputer 31 calculates i using equation 16 after calculating θ1 and θ2.

The microcomputer 31 then calculates θ using equation 17 after calculating i.

Figure 4:
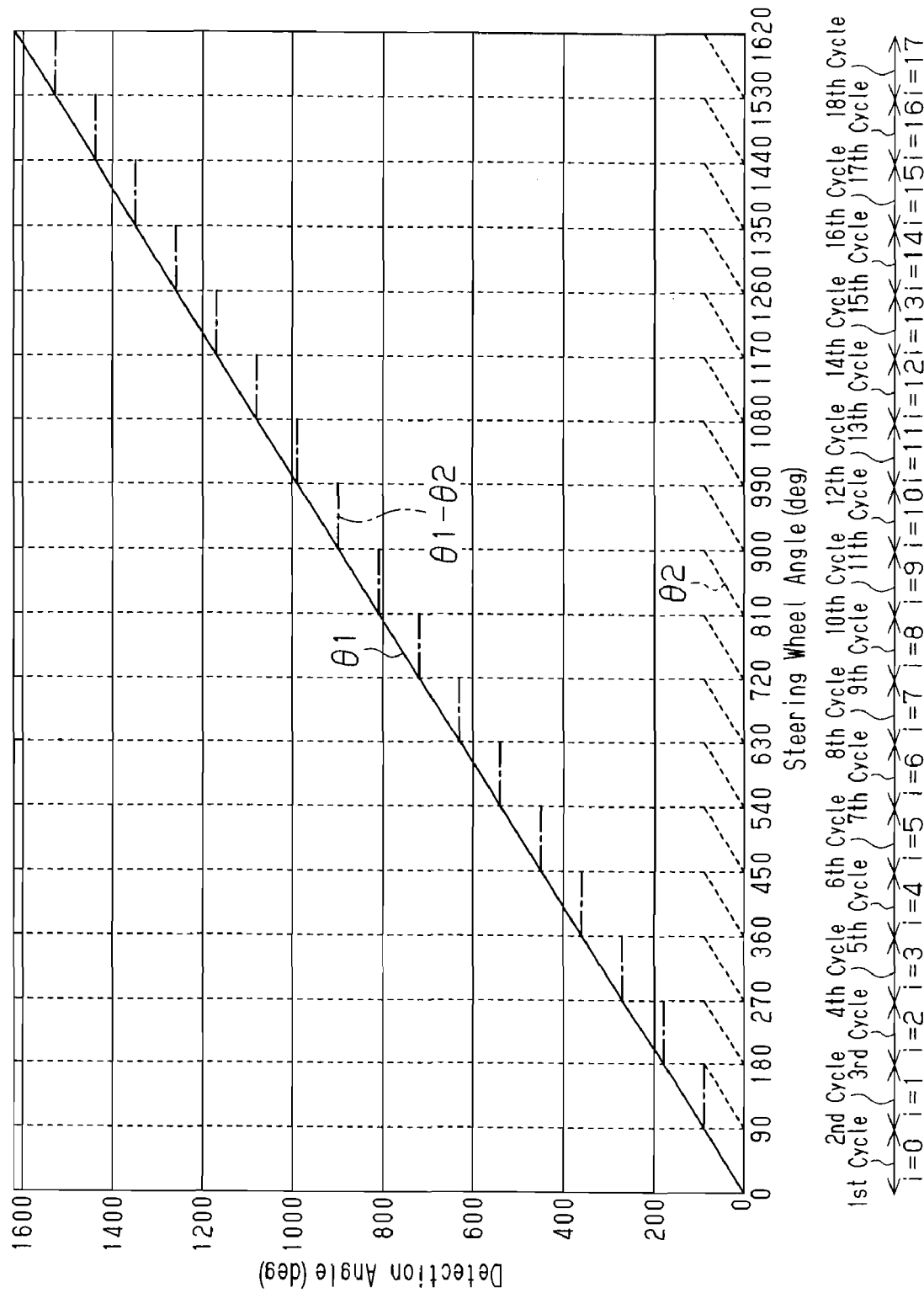
FIG. 4 is a graph showing $\theta 1$, $\theta 2$, $\theta 1 - \theta 2$ in relation with a steering wheel angle.

In FIG. 4, θ1 with respect to the steering wheel angle (rotation operated angle of steering wheel) is shown by a solid line, θ2 with respect to the steering wheel angle is shown by broken lines, and "θ1−θ2" with respect to the steering wheel angle is shown by dashed lines.

In the present embodiment, the number of teeth L (54) of the second detection gear 12 is set to be greater than the number of teeth m (51) of the first detection gear 11. The rotation cycle of the second detection gear 12 thus becomes longer than the rotation cycle of the first detection gear 11. Therefore, when the steering wheel is rotated from a reference position (steering wheel angle=0 degree) at which both the rotational angle α' of the first detection gear 11 and the rotational angle β' of the second detection gear 12 are 0 degrees, "α'−β'" linearly changes from 0 degree with respect to the steering wheel angle. Therefore, the rotational angle θ of the steering shaft 1 within one cycle of "α'−β'" may be obtained using "α'−β'".

θ(θ1) is expressed as shown below by substituting equation 5 to α in equation 12 and substituting equation 10 to β in equation 12.

$$\theta = mL/\{n(L-m)\} \times (\alpha' - \beta') \quad (18)$$

In this manner, θ is calculated. In the present embodiment, the microcomputer 31 calculates θ1 using equation 12 so as to calculate θ1 using "α'−β'" as in equation 18.

One cycle of θ1, which is calculated from "α'−β'", is in the range of 0 to mL/{n(L−m)}×Ω degrees. Since m=51, L=54, n=102, Ω=180 degrees are satisfied in the present embodiment, one cycle of θ1 is in the range of 0 to 1620 degrees, as shown by the solid line in FIG. 4.

Therefore, in the present embodiment, θ is obtained within the range of 0 to 1620 degrees if i is calculated from equation 16 using θ1 calculated in equation 12, and θ is calculated from equation 17 using i. That is, θ is obtained within the range of 0 to 1620 degrees, which is a range wider than the range of 0 to Ω degrees (180 degrees) without requiring the dark current. Thus, even if the ignition is turned ON after the steering wheel is rotated to a new rotational angle θ within the range of 0 to 1620 degrees when the ignition is turned OFF, the microcomputer 31 may immediately obtain the new rotational angle θ. In this manner, the rotational angle θ may be detected in a wide range without requiring the dark current by calculating θ using "α'−β'".

Here, α and β obtained by the microcomputer 31 contain measurement errors. Therefore, θ1 calculated by equation 12 using α and β also contains error. Δθ1 derived from equation 12 is expressed as shown below with the error of α set to Δα, the error of β set to Δβ, and the error of θ1 set to Δθ1.

$$\Delta\theta 1 = mL/\{n(L-m)\} \times (\Delta\alpha - \Delta\beta) \quad (19)$$

Furthermore, θ2 calculated by equation 13 using α also contains error. Δθ2 is expressed as shown below from equation 13 when the error of θ2 is set to Δθ2.

$$\Delta\theta 2 = m/n \times \Delta\alpha \quad (20)$$

Moreover, i calculated by equation 16 using θ1 and θ2 also contains error. Δi derived from equation 16 is expressed as shown below with the error of i set to Δi.

$$\Delta i = (\Delta\theta 1 - \Delta\theta 2)n/(m\Omega) \quad (21)$$

Δi is expressed as shown below by substituting equation 19 to Δθ1 in equation 21 and substituting equation 20 to Δθ2 in equation 21.

$$\Delta i = (m\Delta\alpha - L\Delta\beta)/\{(L-m)\Omega\} \quad (22)$$

Since α and β contain errors due to the same factor, the maximum value of |Δi|, which is the absolute value of Δi, can be expressed as shown below from equation 22 under the assumption that |Δα|, which is the absolute value of Δα, and |Δβ|, which is the absolute value Δβ are equal to each other (|Δα|=|Δβ|).

$$|\Delta i| = (m+L)/\{(L-m)\Omega\} \times |\Delta\alpha| \quad (23)$$

Although i should be an integer, i calculated by equation 16 through equations 12 and 13 does not become an integer since α and β contain measurement error. In the present embodiment, i calculated by equation 16 is rounded and calculated as an integer. Therefore, in the present embodiment, an incorrect i is calculated when rounded if |Δi| expressed by equation 23 is greater than or equal to 0.5. That is, i of an integer greater by 1 from the true i, or i of an integer smaller by 1 from the true i is calculated. Thus, |Δi| expressed by equation 23 must be less than 0.5 in the present embodiment. This may be expressed as shown below.

$$|\Delta i| = (m+L)/\{(L-m)\Omega\} \times |\Delta\alpha| < 0.5 \quad (24)$$

Therefore, Δα and Δβ must satisfy the following equation.

$$-(L-m)\Omega/\{2(m+L)\} < \Delta\alpha = \Delta\beta < (L-m)\Omega/\{2(m+L)\} \quad (25)$$

When the error of θ is set to Δθ, Δθ is expressed as shown below since Δθ is obtained by multiplying m/n to Δα from equation 17.

$$-(L-m)m\Omega/\{2n(m+L)\} < \Delta\theta < (L-m)m\Omega/\{2n(m+L)\} \quad (26)$$

The extent of Δθ expressed by equation 26 is then verified.

In the present embodiment, a method (first method) for calculating θ1 from equation 12, calculating i from equation 16 using θ1, and calculating θ from equation 17 using i is adopted when calculating θ using "α'-β'". A method (second method) for directly calculating θ from equation 12 may be used in place of the first method when calculating θ using "α'-β'". The extent of Δθ produced when employing the first method as in the present embodiment, and the extent of Δθ produced when employing the second method, which differs from the present embodiment, are compared.

When the first method is used as in the present embodiment, Δθ is expressed by equation 26.

Δθ is expressed as below from equation 12 when the second method different from the present embodiment is used.

$$\Delta\theta = mL/\{n(L-m)\} \times (\Delta\alpha - \Delta\beta) \quad (27)$$

Since α and β contain errors due to the same factor, the maximum value of |Δθ| derived from equation 27 is expressed as shown below under the assumption that |Δα| and |Δβ| are equal to each other (|Δα|=|Δβ|).

$$|\Delta\theta| = 2mL/\{n(L-m)\} \times |\Delta\alpha| \quad (28)$$

That is, Δθ is expressed as shown below.

$$-2mL/\{n(L-m)\} \times \Delta\alpha < \Delta\theta < 2mL/\{n(L-m)\} \times \Delta\alpha \quad (29)$$

Since Δα must satisfy equation 25, Δθ is expressed as shown below by substituting "(L−m)Ω/{2(m+L)}" to Δα of equation 29.

$$-2mL\Omega/\{2n(m+L)\} < \Delta\theta < 2mL\Omega/\{2n(m+L)\} \quad (30)$$

When comparing Δθ expressed by equation 26 and Δθ expressed by equation 30, the denominators are equal. However, the numerators are different in that "L−m" is multiplied to mΩ in equation 26, whereas "2L" is multiplied to mΩ in equation 30. Thus, it is apparent that the error Δθ becomes smaller when the first method is used as in the present embodiment than when the second method, which differs from the present embodiment, is used.

Finally, a method for determining whether or not θ calculated by equation 17 is appropriate will be described.

The possibility of an incorrect i being calculated by rounding, that is, the possibility that i of an integer greater by 1 from the true i, or i of an integer smaller by 1 from the true i may be calculated when i calculated by equation 16 is rounded and calculated as an integer has already been described.

If θ presently calculated from equation 17 is set to θa, and θ previously calculated from equation 17 is set to θb, the approximate value of "θa−θb" is expressed as below when θa is presently calculated from equation 17 using the true i.

$$\theta a - \theta b = m/n \times (\alpha + i\Omega) - m/n \times (\alpha + i\Omega) = 0 \quad (31)$$

When the steering wheel rotates five times in one second, "θa−θb" is set to "5×360 degrees/sec×1/1000 sec=1.8 degree" assuming θ is calculated in a 1 ms cycle. In this case, the angle approximated to "0 degrees" in equation 31 is actually "1.8 degrees". Therefore, determination is made that an appropriate θa is calculated if "θa−θb" is within the range of "−1.8 degrees≦θa−θb≦1.8 degrees".

If "θa−θb" is not within the range of "−1.8 degrees≦θa−θb≦1.8 degrees", determination is made that an inappropriate θa has been calculated. If the present θ calculated from equation 17 is set to θa and the previous θ calculated from equation 17 is set to θb, the approximate value of "θa−θb" is expressed as shown below when the present θa is calculated from equation 17 using i of an integer greater by 1 from the true i, or i of an integer smaller by 1 from the true i.

$$\theta a - \theta b = m/n \times (\alpha + i\Omega) - m/n \times [\alpha + (i+1)\Omega] = \pm m/n \times \Omega \quad (32)$$

Since m=51, n=102, and Ω=180 degrees are satisfied in the present embodiment, "±m/n×Ω degrees" expressed in equation 32 is set to "90 degrees". Therefore, in the present embodiment, θa that has jumped by about 90 degrees with respect to θb is calculated if the present θa is calculated from equation 17 using i of an integer greater by 1 from the true i, or i of an integer smaller by 1 from the true i. If the present θa has jumped with respect to the previous θb, determination is made that an inappropriate θa has been calculated.

The above embodiment of the present invention has the advantages described below.

(1) The rotational angle α of the first detection gear 11 within one cycle obtained by the microcomputer 31 and the integer i indicating the number of cycles completed by the first detection gear 11 in relation with the rotational angle α are used when θ is calculated from equation 17. Thus, in addition to when the first detection gear rotates within the range of 0 to Ω degrees (first cycle (i=0)), θ is detected without requiring the dark current when the first detection gear 11 rotates within the range of Ω to 2Ω degrees (second cycle (i=1)) and also when rotating within the range exceeding the above range. Therefore, the rotational angle θ of the steering shaft 1 is detected in a wide range without requiring the dark current.

(2) In relation with (1), θ is obtained without requiring a dark current in the range of 0 to 1620 degrees, which is a range wider than 0 to Ω (180 degrees), in the present embodiment.

(3) In the present embodiment, the method (first method) for calculating θ1 from equation 12, calculating i from equation 16 using θ1, and calculating θ from equation 17 using that i is employed when calculating θ using "α'-β'". Thus, the error Δθ becomes smaller than when a method (second method) of directly calculating θ from equation 12 is used in place of the first method when calculating θ using "α'-β'". That is, θ is detected at high precision.

(4) Determination is made on whether or not the present θa calculated from equation 17 is appropriate based on whether or not the present θa has jumped from the previous θb.

It should be apparent to those skilled in the art that the present invention may be embodied in many other specific forms without departing from the spirit or scope of the invention. Particularly, it should be understood that the present invention may be embodied in the following forms.

The relationship between the number of teeth n of the main gear 10 and the number of teeth m of the first detection gear 11 is not limited to n>m. That is, n=m or n<m are also possible. However, it is preferred that n>m be satisfied to increase the resolution of the rotational angle θ of the steering shaft 1. The effect of detecting the rotational angle θ of the steering shaft 1 in a wide range without requiring dark current is still obtained even under the conditions of n=m or n<m.

The relationship between the number of teeth m of the first detection gear 11 and the number of teeth L of the second detection gear 12 is not limited to L=m+3. That is, L=m+k (k is a positive integer greater than or equal to 1, i.e., natural number) is also possible. If L=m+1 is satisfied, the range of the rotational angle θ that can be detected without requiring dark current is widened to a maximum when detecting the rotational angle θ of the steering shaft 1. However, the effect of detecting the rotational angle θ of the steering shaft 1 in a wide range without requiring the dark current is still obtained even if L=m+K (k≧2) is satisfied.

Ω is not limited to 180 degrees.

The rotational angle α of the first detection gear 11 within one cycle and the rotational angle β of the second detection gear 12 within one cycle configuration do not have to be magnetically detected. For example, α and β may be optically detected.

The present examples and embodiments are to be considered as illustrative and not restrictive, and the invention is not to be limited to the details given herein, but may be modified within the scope and equivalence of the appended claims.

What is claimed is:

1. A device for detecting rotational angle of a rotor, the device comprising:

a main gear rotated integrally with the rotor and including an n number of teeth;

a first detection gear including an m number of teeth engageable with the main gear and rotated together with the main gear;

a second detection gear including an L number of teeth engageable with the main gear and rotated together with the main gear, wherein L is greater than m;

a first detection means for detecting rotational angle α of the first detection gear within a cycle set in accordance with a predetermined angle;

a second detection means for detecting rotational angle β of the second detection gear within the cycle; and a rotational angle calculating means for calculating a rotational angle θ of the rotor using the rotational angle α of the first detection gear within the cycle detected by the first detection means and the rotational angle β of the second detection gear within the cycle detected by the second detection means;

wherein the rotational angle calculating means calculates a first rotational angle θ1 based on θ1=mL/{n(L−m)}× [(α−β)+(i−j)Ω], where Ω is an angle corresponding to the cycles of α and β, i is an integer indicating the number of cycles completed by the first detection gear in relation with the rotational angle α, j is an integer indicating the number of cycles completed by the second detection gear in relation with the rotational angle β, i=j is satisfied in the case of α≧β, and i=j+1 is satisfied in the case of α<β;

the rotational angle calculating means calculates a second rotational angle θ2 based on θ2=m/n×α;

the rotational angle calculating means calculates the integer i indicating the number of cycles completed by the first detection gear in relation with the rotational angle α based on i=(θ1−θ2)n/(mΩ) using the calculated first rotational angle θ1 and the second rotational angle θ2; and the rotational angle calculating means calculates the rotational angle θ of the rotor based on θ=m/n×(α+iΩ) using the calculated integer i.

2. The device according to claim 1, wherein the calculated i is rounded to an integer if i as calculated by i=(θ1−θ2)n/(mΩ) is not an integer due to measurement error.

3. The device according to claim 1, wherein L=m+1.

* * * * *